Feb. 23, 1971  R. WETZEL  3,565,566
ALIGNING DEVICE FOR REAR VISION MIRROR
Filed July 18, 1967

INVENTOR
ROBERT WETZEL
BY Richard O. Church
ATTORNEY

United States Patent Office 3,565,566
Patented Feb. 23, 1971

3,565,566
ALIGNING DEVICE FOR REAR VISION MIRROR
Robert Wetzel, Box 280, R.D. 1, Bath, Pa. 18014
Filed July 18, 1967, Ser. No. 654,266
Int. Cl. G01b 11/27; G02b 5/08
U.S. Cl. 356—72                                 7 Claims

ABSTRACT OF THE DISCLOSURE

Rear vision mirrors for motor vehicles are provided with visual indicating means to enable the operator to position the plane of the mirror perpendicularly to a beam of light impinging on the mirror.

---

This invention relates to rear vision mirrors for motor vehicles and more particularly to a device that will facilitate aligning the plane of a rear vision mirror perpendicularly to a beam of light that is impinging upon the mirror.

Modern motor vehicles are universally equipped with headlights of the dual beam type capable of providing two levels of illumination generally known as "low beam" and "high beam," the former of which provides illumination for a safe distance ahead of the automobile and somewhat to the right of the center of the roadway so as to prevent projection of the light beam into the eyes of approaching motorists. The "high beam" is designed to provide full illumination ahead of the automobile to a greater distance and, to some extent, to each side of the motor vehicle.

Selection of the desired beam may be made by two methods. The commonly used means is a foot-operated button located on the motor vehicle floor convenient to the driver's left foot, which, when depressed while the headlights are in operation, will change the headlights from high beam to low beam, or from low beam to high beam, as the case may be. Another device gaining general acceptance comprises a switch to perform the desired function which is activated by an electric eye mounted on the motor vehicle dashboard so that a predetermined amount of light, such as from the headlights of an approaching motor vehicle, or from street lights in city areas, will cause the headlights to switch from high beam to low beam, and conversely, the removal of such incident light will cause the lights to return to high beam.

The potentially hazardous effect of high beams to other motorists is not limited to motorists who may be approaching in opposing lanes of traffic. A commensurate hazard exists when the high beams of a following motor vehicle are projected into an automobile ahead in the same line of traffic, and it is to this problem that this invention is directed. The hazard exists because the light from the headlights of the following motor vehicle is focused directly into the eyes of the driver of the leading motor vehicle by way of his inside rear vision mirror, which, for maximum utility, is commonly adjusted to permit the driver a view directly rearward of his motor vehicle. Even when the leading motor vehicle is equipped with the so-called "no-glare" mirror especially suited for nightime use, the intensity of the high beams of a following motor vehicle may still cause a blinding effect on the driver of the leading motor vehicle when the light beams are reflected from the commonly used side mounted exterior rear vision mirror and into the eyes of the driver. Further, the high beams of the following motor vehicle will cause intense illumination of the passenger compartment of the leading motor vehicle which is distracting to the driver.

Such hazardous conditions commonly arise in either of two circumstances. First, the leading or object motor vehicle may be overtaken on the highway by a motor vehicle approaching from the rear which has had its high beams in operation prior to overtaking the leading motor vehicle. The second instance is where the object motor vehicle overtakes and passes another motor vehicle, the latter having its high beams in operation to illuminate the roadway ahead. However, when the object motor vehicle pulls into line ahead of the other motor vehicle, the driver of the latter motor vehicle may not lower his beams at that time. While it is generally required by law that high beams not be used when following another motor vehicle within certain prescribed distances, many drivers inadvertently fail to reset their headlight beams in the few instances mentioned above. Furthermore, if the motor vehicle is equipped with automatic beam switching means (upon which the driver relies for the selection of the proper headlight beams), these devices will not cause the headlights to switch to low beam as desired because the device will not be activated by the small amount of light emitted by the red tail lights of the motor vehicle ahead.

If the driver of the following motor vehicle is thus unaware of the setting of his headlights and the hazard and discomfort he is causing for the driver ahead, there is generally only one means by which he may be apprised of the situation, and that is for the driver of the leading or object motor vehicle to adjust his rear view mirror to reflect the light beam to the following car. This will automatically cause the headlights of the following motor vehicle to be dimmed if it is equipped with electric eye control, and, even if not, will present a signal to the driver of the following motor vehicle. This process of adjusting the rear view mirror is, however, a difficult matter for the driver of the object motor vehicle since in order to achieve proper alignment of the plane of the rear view mirror perpendicular to the impinging headlight beam, he must move from his normal driving position at the steering wheel of the motor vehicle to a point somewhat directly in front of the rear view mirror, which is normally mounted at the center of the dashboard or windshield area. This, of course, is dangerous in that proper control of the motor vehicle by the driver in this position is difficult.

Accordingly, it is an object of the instant invention to provide a means for causing the electric eye mechanism of a following vehicle to switch its headlights from high beam to low beam.

Another object of this invention is to provide means whereby a signal may be directed to the driver of a following motor vehicle to inform him that his lights are set on high beam.

Yet another object of this invention is to provide a means for adjusting the rear vision mirror of a leading motor vehicle to send a signal to a following motor vehicle without distracting the driver of the leading vehicle.

These and other objects of this invention are achieved by providing an attachment mounted on the inside rear vision mirror of a motor vehicle that is constructed so that when the plane of the mirror is perpendicularly aligned to an incident beam of light, the device will provide a visual indication of such alignment to the driver.

The invention will be better understood in connection with the accompanying drawings, in which.

Figure 1:
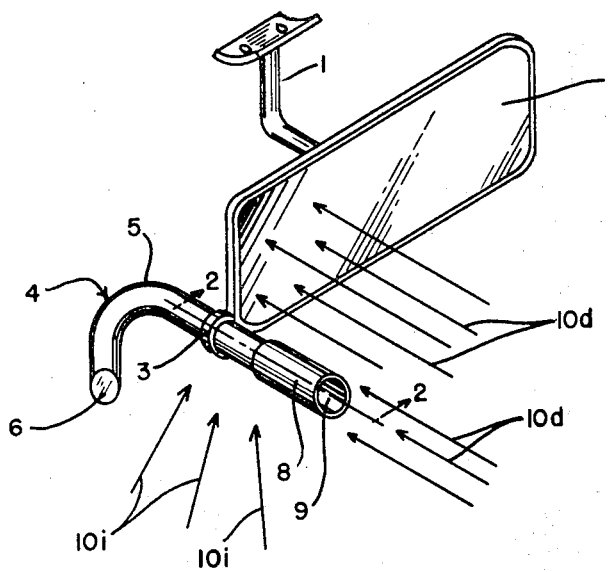
FIG. 1 is a perspective view of a device constructed in accordance with the teachings of this invention attached to the rear vision mirror of a motor vehicle.
Figure 2:
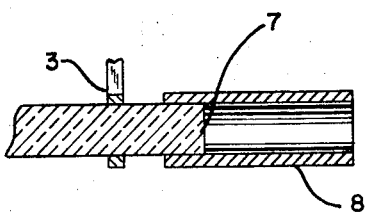
FIG. 2 is a cross sectional view of the device shown in FIG. 1 along the line 2—2.

In FIG. 1, there is illustrated one of the embodiments of this invention in which a metal bracket 1 supports the rear vision mirror 2 of the type commonly used in automobiles and other motor vehicles. A mounting bracket 3 is provided at one side of the mirror 2 to support a bent light conducting rod 4. One leg of the rod 4 is aligned with its axis perpendicular to the plane of the mirror 2. The rod is then bent as at 5 in order to cause the other end of the rod 6 to point generally toward the driver of the motor vehicle. As best can be seen in FIG. 2, the end of the rod 7 may be surrounded by a protective shroud 8. The protective shroud is nothing more than a cylindrical piece of opaque material adapted to fit over the end of the rod 7 and have an opening 9 at its other end.

While not necessary, it may be advantageous to make the light transmitting rod colored, such as red, so that when light is being transmitted through the rod, it will glow with such a color. Alternatively, either end of the rod may be colored, or as shown in FIG. 2, the end of the rod 7 may be capped with a small transparent color disc.

Glass or plastic materials may be used for the glass transmitting rod, and a plastic material with good optical properties, such as a methyl methacrylate, is particularly suitable.

In operation, direct light beams from the headlights of a following vehicle are indicated by the arrows 10d. Arrows 10i indicate incident or scattered light coming from other sources. As readily can be understood, if the plane of the mirror is aligned perpendicular to light beams 10d, the light beams will enter opening 9 in the shroud 8 causing light to impinge upon the end of the rod 7. Since the rod will conduct the light around the bend 5, a glow of light will be produced at the end of the rod 6 to indicate quite clearly to the driver that the mirror 2 is in perpendicular alignment with the beam of light of the following vehicle. When this takes place, sufficient light will be reflected to the following car to cause any automatic electric eye device immediately to switch the following car's headlights to low beam. Also, if the follow car is not equipped with such an electric eye device, a visual signal will be presented to the driver of the following vehicle to remind him that his headlights are on high beam. It can be appreciated that by the use of this device, it is possible for the driver tof the leading car to adjust his rear vision mirror in the manner indicated above without physically moving his head into alignment with the mirror. Thus, this adjustment of the mirror to cause the desired signal may be made without distracting the driver or causing him to change positions within the moving vehicle.

Figure 3:
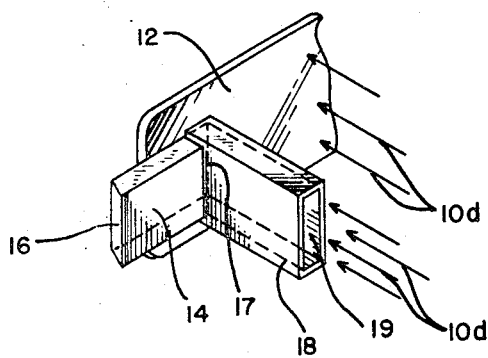
FIG. 3 is a perspective view of an alternative embodiment of this invention attached to the rear vision mirror of a motor vehicle.

In FIG. 3, a slightly different variation of this invention is presented wherein a prism 14 is used instead of a bent rod 4. As shown in FIG. 3 direct light 10d will enter an opening 19 in a shroud 18 and cause the light 10d to impinge upon angled surface 17 of prism 14. The light will be refracted toward inclined surface 16 where it will be visible to the operator of the automobile. As the details of construction of the prism to cause such refraction of light are well known to those skilled in the art, it is felt that further detail is unnecessary.

Figure 4:
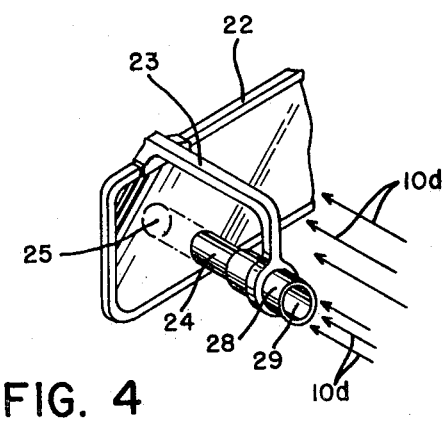
FIG. 4 is a perspective view of yet another embodiment of this invention attached to the rear vision mirror of a motor vehicle.

Referring to FIG. 4, a slightly different variation is presented in which only a straight cylindrical rod 24 is used as the light carrying device. The rod 24 is supported by a bracket 23 and is attached at its one end to a shroud 28 having an opening at 29. In this instance, when the light beam of the following automobile 10d impinges directly into the orifice 29, a bright spot of light will be presented at 25 which is clearly visible to the driver. As previously mentioned, it is advantageous to color either the rod or place a color disc at one end of the rod so that the spot of light 25 will have a bright color to distinguish clearly from the white light of the following headlights.

In yet another variation of this invention, a button reflector of the type commonly used with bicycles may be mounted on the rear vision mirror. If such a reflector is properly designed, its facets will reflect light only when it impinges substantially directly upon it. While this device is usable, it is not as precise as the above described apparatus since, by use of the opaque shroud, a visual indication is presented to the driver only at such times as the plane of the mirror is adjusted quite precisely to within only a few degrees of the desired perpendicular position.

Although certain embodiments of the invention have been shown in the drawings and described in the specification, it is to be understood that the invention is not limited thereto, is capable of modification, and can be rearranged without departing from the spirit and scope of the invention.

I claim:

1. In combination with a motor vehicle rear vision mirror:
   apparatus for aligning the plane of the face of the mirror perpendicularly to the direction of beams of light from a directed impinging source, comprising:
   elongate light-conducting means, having a longitudinal axis of conduction, for conducting only such light beams which are substantially parallel to the axis of conduction;
   means utilizing light beams received by the conducting means for presenting a visual signal to the operator of the motor vehicle; and
   means fixedly mounting the apparatus to the mirror with the axis of conduction of the conducting means disposed substantially perpendicularly to the plane of the mirror surface.

2. A device according to claim 1 in which said apparatus comprises a bent light conducting rod having two legs, the axis of said first leg being fixedly positioned perpendicularly to the plane of said mirror and the axis of said second leg pointing generally in the direction of the operator of said vehicle.

3. A device according to claim 2 in which a shroud member comprised of an open-ended opaque hollow rod is mounted in surrounding relationship to the free end of said first leg of said rod.

4. A device according to claim 1 including means to impart color to light passing through said rod.

5. A device according to claim 1 in which said apparatus is comprised of a prism rigidly attached to said mirror having a first face adapted to receive light from said directed beam of light and a second face adapted to direct a portion of said beam of light toward the operator of said motor vehicle.

6. A device according to claim 5 including an open-ended opaque shroud adapted to enclose said first face of said prism.

7. A device according to claim 1 in which said receiving means is comprised of an open-ended, opaque, light-transmitting hollow rod spaced from said mirror with its axis aligned perpendicularly to the surface of said mirror and the signal-presenting means includes means to impart a color to light passing through said rod.

References Cited
UNITED STATES PATENTS 3,217,292  11/1965  Henderson _____ 350—96X RONALD L. WIBERT, Primary Examiner O. B. CHEW II, Assistant Examiner U.S. Cl. X.R.

33—46; 116—28; 350—96, 288